United States Patent [19]

Goodsell

[11] 4,336,416

[45] Jun. 22, 1982

[54] FIRE-RATED FEED-THROUGH FITTING FOR TRANSFERRING INSULATED WIRES THROUGH A CONCRETE FLOOR

[75] Inventor: John P. Goodsell, Stratford, Conn.

[73] Assignee: Harvey Hubbell Incorporated, Orange, Conn.

[21] Appl. No.: 48,703

[22] Filed: Jun. 15, 1979

[51] Int. Cl.³ .............................................. H02G 3/22
[52] U.S. Cl. ..................................... 174/48; 169/48; 248/56; 285/413; 339/119 C
[58] Field of Search ...................... 174/48, 49; 169/48; 52/221, 232; 248/56; 85/63; 285/412, 413, 337, 420; 339/119 C

[56] References Cited

U.S. PATENT DOCUMENTS

| | | | |
|---|---|---|---|
| 3,751,576 | 8/1973 | Klinkman et al. | 174/48 |
| 3,803,341 | 4/1974 | Klinkman et al. | 174/48 |
| 3,864,883 | 2/1975 | McMarlin | 174/48 X |
| 3,965,629 | 6/1976 | Pearson | 174/48 X |
| 3,995,102 | 11/1976 | Kohaut | 174/48 |
| 4,061,344 | 12/1977 | Bradley et al. | |
| 4,091,231 | 5/1978 | Sotolongo | 174/48 |
| 4,099,020 | 7/1978 | Kohaut | 174/48 |

FOREIGN PATENT DOCUMENTS 2162251  6/1973  Fed. Rep. of Germany .

OTHER PUBLICATIONS

Abrams et al., *Fire Tests of Poke-Through Assemblies* Fire Journal, May 1971 pp. 56-67.

Primary Examiner—Gene Z. Rubinson
Assistant Examiner—D. A. Tone
Attorney, Agent, or Firm—Jerry M. Presson

[57] ABSTRACT

A fire-rated feed-through fitting for transferring insulated wires through an opening formed in a concrete floor for connection to receptacles mounted on a compartmentalized head assembly, which includes a feed-through assembly disposed in the floor opening and non-rigidly coupled to the head assembly, and a retaining clamp for securing the fitting to the floor. The fitting includes a floor cup for storing excess slack wire, a conduit formed of at least one section, and at least one intumescent fire insulating barrier disposed between the floor cup and the conduit. The retaining clamp includes a collar portion slidably and rotably disposed on the feed-through conduit, and fastening screws for securing the collar portion to the conduit. Retractable arm portions are slidably mounted on the collar portion to enable utility of the fitting with floor openings of minimum size. The retractable arm portions include threaded fastening screws which are independently adjustable to engage a floor bottom face surface and thereby clamp the fitting of the invention to the floor by means of the floor cup and the retaining clamp.

42 Claims, 11 Drawing Figures

FIG. 9

FIRE-RATED FEED-THROUGH FITTING FOR TRANSFERRING INSULATED WIRES THROUGH A CONCRETE FLOOR

BACKGROUND OF THE INVENTION

1. Field of the Invention

This invention generally relates to cable conduit devices, and more particularly to a fire-rated feed-through fitting for transferring insulated wires through a concrete floor of a building by which electrical power and other signals, such as telecommunications signals, are transmitted from a source located at one face of the floor through an opening in the foor and to respective receptacles mounted on the opposite face of the floor.

2. Description of the Prior Art

Modern office buildings are typically multi-floor structures in which each floor is formed of a concrete slab. Typically, with this form of structure, it has been customary to transmit power and telecommunications signals from floor to floor through openings provided in each floor for that purpose. Thus, it has been customary to form openings in the concrete floors, to insert a feed-through fitting through the opening, to pass the wires through the feed-through fitting from the opposite face of the floor to the top face of the floor, and to make connection to an electrical outlet mounted over the opening on the top face of the floor. While this technique for wiring a building is perfectly satisfactory from the standpoint of achieving the requisite wiring interconnections throughout the building, nevertheless it has been found that the ability of the building to contain a fire which may have been started on one floor is compromised as a result of the tendency of the fire to spread through the feed-through openings to adjacent floors.

Prior art feed-through fittings have included a head assembly mounted over the floor opening, a conduit secured to the head assembly and inserted in the floor opening, and a bottom face receptacle secured to the conduit and abutting the bottom face of the floor such that the floor is in effect clamped between the head assembly and the bottom face receptacle, thereby maintaining the entire assembly in place. Additionally, it has been known to separate the feed-through conduit into two sections and to dispose between the conduit sections an intumescent barrier which expands upon subjection to heat to block the opening and thereby retard the spread of fire and smoke through the opening. Similarly, intumescent barriers have also been disposed within the conduit itself to likewise prevent the spread of fire and smoke through the conduit. In spite of these precautions, however, it has been found that the heat generated by a fire is often of such intensity that the intumescent barrier is itself incinerated, thereby losing its effectiveness. Furthermore, since the conduits themselves are formed of a metal, and are typically rigidly secured to the head assembly by bolts, screws or other rigid means, these prior art fittings serve as an excellent thermal conductor of heat between floors, thereby aggravating the fire containment problem.

Another problem associated with the prior art feed-through devices involves the actual connection of the wires fed through the feed-through assembly to the receptacles mounted on the head assembly. Typically, in order for the workmen to have enough wire to work with during connection of the wire through the receptacles, it is necessary to draw through the opening sufficient slack wire with which to work during the actual making of the electrical interconnection. Prior art feed-through fittings have not provided adequate space between the head assembly and the feed-through conduit for storage of excess slack wire, resulting in squeezing of the slack wire between the head assembly and the conduit, and potential puncture of the wire insulation.

A further problem associated with prior art feed-through fittings resides in the mounting techniques by which the fitting is retained in place in the floor opening. This problem is particularly acute in the mounting of feed-through fittings through floors having a corrugated bottom face, as is commonly found in modern buildings. In that event, it has been found that the surface of the bottom face receptacle is often mounted at an angle with respect to the transverse plane of the concrete floor, thereby resulting in transverse stresses in the means used to secure the bottom face receptacle, which can often lead to an unacceptably loose or unstable feed-through mounting.

Typical feed-through insertion fittings of the prior art are disclosed in U.S. Pat. Nos. 3,751,576; 3,803,341; 3,864,883; 3,995,102; and 4,099,020. See also Abrams et al, "Fire Tests of Poke-Through Assemblies", *Fire Journal*, May 1971, pp. 56–67 for an overview of the prior art.

SUMMARY OF THE INVENTION

Accordingly, it is the object of this invention to provide a new and improved fire-rated feed-through fitting for transfering insulated wires through an opening formed in a concrete floor of a building for making connection to respective receptacles mounted on an opposite floor face, which fitting is free of the deficiencies of the prior art fittings as noted above.

Another object of this invention is to provide a novel fire-rated feed-through fitting exhibiting improved fire retardation characteristics.

Yet another object of this invention is to provide a novel fire-rated feed-through fitting exhibiting minimal thermal conductivity through an opening formed in the floor between the opposite faces of the floor.

A further object of this invention is to provide a novel fire-rated feed-through fitting characterized by non-rigid mechanical joints which result in reduced thermal conductivity.

Yet another object of this invention is to provide a novel fire-rated feed-through fitting which includes means for reliably storing excess slack wire after connection of wires to receptacles mounted in a head assembly.

Another object of this invention is to provide a novel fire-rated feed-through fitting having an improved retaining device by which the fitting is secured in the floor opening, essentially regardless of the contour of the floor face to which the fitting retaining clamp is applied, whether corrugated or smooth.

A further object is to provide a novel feed-through fitting characterized by non-rigid mechanical interconnection of sub-assemblies, which is nevertheless securely mounted in a floor opening and able to withstand lateral forces applied, inadvertently or otherwise, to an above-floor head assembly.

Yet another object is to provide a novel feed-through fitting in which separated wire paths are maintained for power wires and telecommunication or other wires through the fitting.

These and other objects are achieved according to the invention by providing a novel fire-rated feed-through fitting for insertion through an opening formed in the floor of a building by which electrical power and other signals are transmitted via wires connected to a source located beneath one face of the floor through the fitting mounted in the opening to respective receptacles connected to the wires and mounted on the opposite face of the floor, which includes a head assembly for mounting the receptacles, which is located above the opening on the top floor face, a feed-through assembly disposed in the floor opening and coupled to the head assembly, and a retaining clamp for securing the fitting to the floor.

The feed-through assembly includes a floor cup for storing excess slack wiring, a conduit for leading insulated wires through the floor opening to the cup, and therethrough to the head assembly, and a fire insulating barrier for retarding the spread of fire through the opening. The floor cup includes an apertured top flange which is supported on the top floor face and has plural integrally formed leg members extending perpendicularly from the top flange into the opening. These leg members are non-rigidly coupled to an apertured bottom flange. The bottom flange in turn is coupled to the conduit by means of a conduit flange which is non-rigidly coupled to the conduit by means of relatively loose mechanical connections, with the fire-retarding insulating barrier disposed between the cup bottom flange and the conduit flange. The cup top flange is secured to the head assembly by means of plural fingers engaging a collar base member and by screw fasteners.

The novel feed-through fitting of the invention includes a novel retaining clamp which is coupled to the conduit and which engages the bottom face of the concrete floor to secure the fitting to the floor. The retaining clamp is rotatable about the conduit and slidable therealong to enable securing of the fitting to floors of different thicknesses. The retaining is formed by a carrier ring having a retaining flange circumscribing an aperture having a minimum transverse dimension larger than the maximum transverse dimension of the conduit, and a retaining collar integrally formed with the retaining flange and appending perpendicularly therefrom around the periphery of the retaining flange aperture to surround the conduit. The retaining collar is provided with threaded holes with set screws disposed in these threaded holes by which the retaining collar, and therefore the retaining clamp, is secured to the conduit after sliding and rotation of the collar to an optimum mounting position. The retaining flange is formed with adjacent pairs of commonly spaced arcuate slots, with two pairs of arcuate shaped arms slidably retained in respective slots, with the arms of a respective pair pivotably coupled together at the ends thereof by means of threaded bosses. Threaded pins are disposed in the threaded bosses of the arm coupling and are separately adjustable to engage the bottom face of the floor upon advance of the threaded pins through respective threaded bosses, such that the floor is firmly clamped between the floor cup and the threaded pins irrespective of the regularity of the bottom floor face.

BRIEF DESCRIPTION OF THE DRAWINGS

A more complete appreciation of the invention and many of the attendant advantages thereof will be readily obtained as the same becomes understood by reference to the following detailed description when considered in connection with the accompanying drawings, wherein:

FIG. 1b is a perspective exploded view from below of the connection between the head and the floor cup of the feed-through fitting embodiment shown in FIG. 1a;

DESCRIPTION OF THE PREFERRED EMBODIMENTS

Figure 1A:
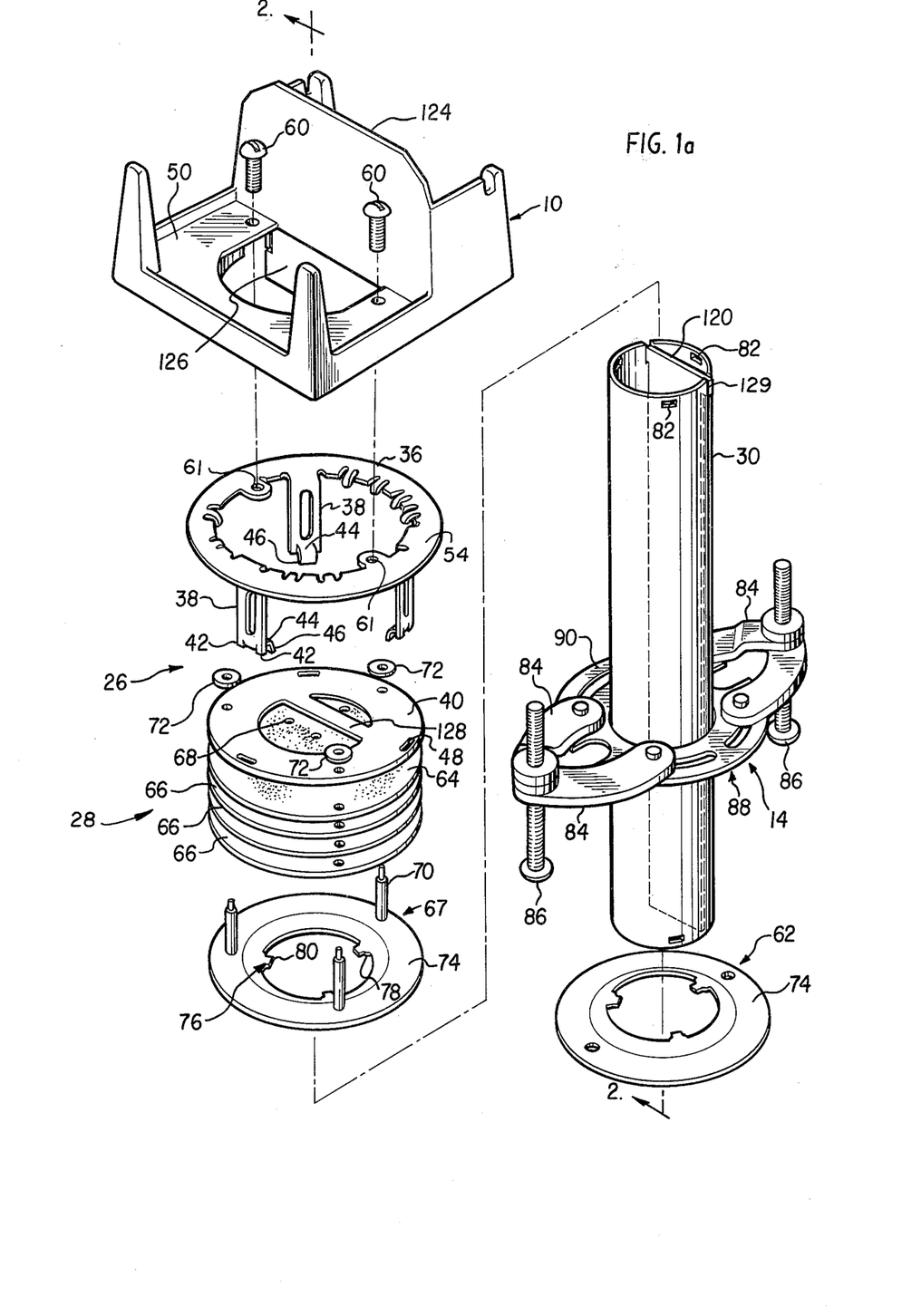
FIG. 1a is a partially exploded perspective view of a first embodiment of the feed-through fitting of the invention.
Figure 1B:
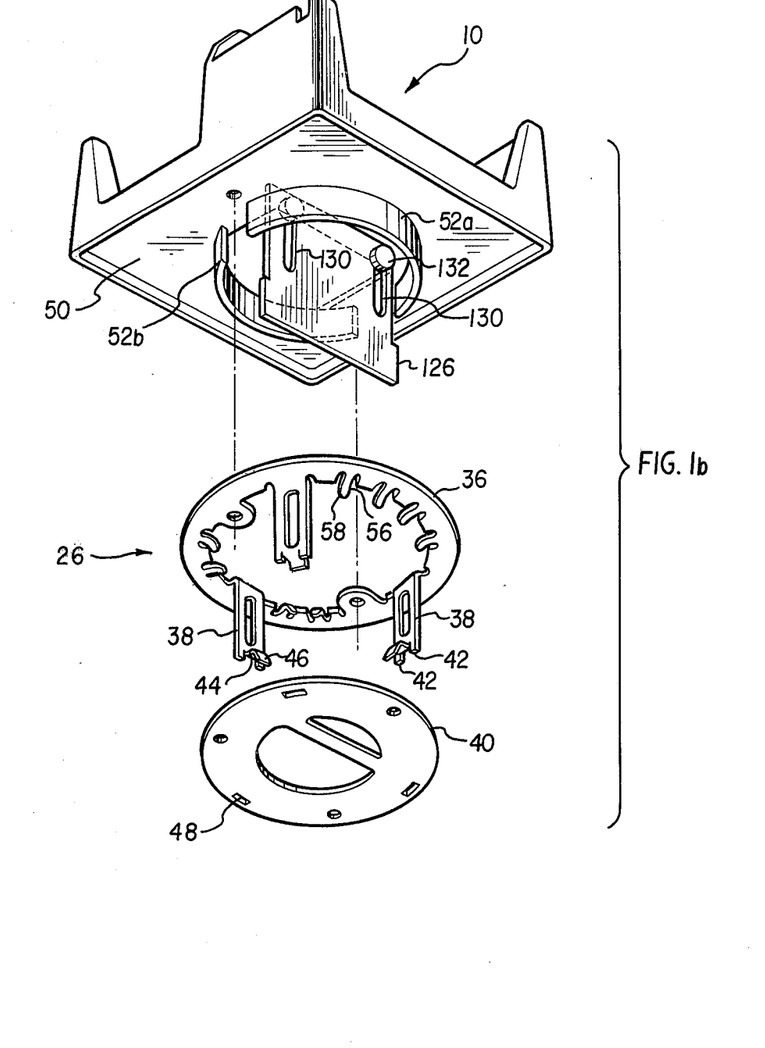
Figure 2:
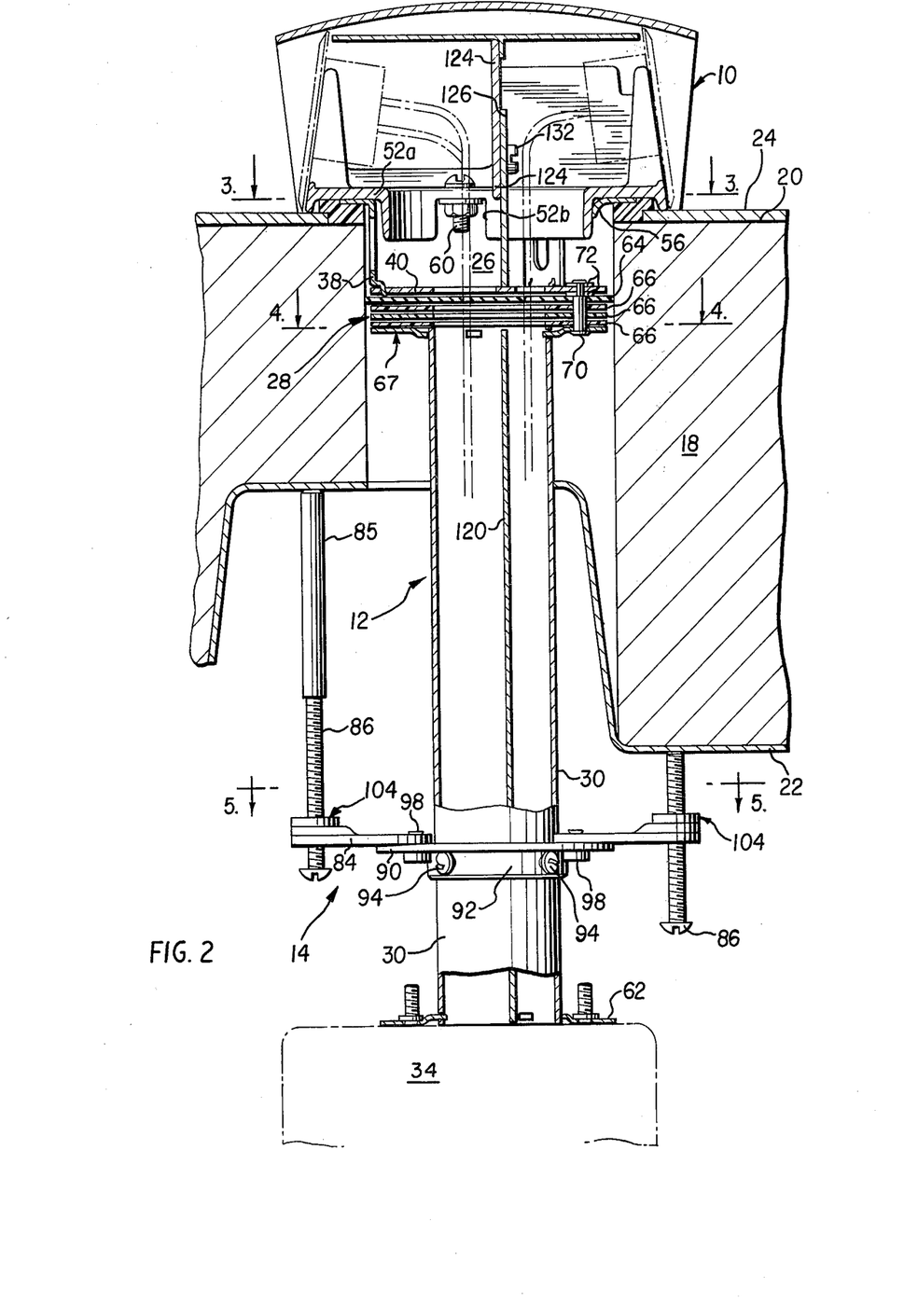
FIG. 2 is a vertical cross-sectional view of the assembled fitting taken along the lines 2—2 of FIG. 1a, with the fitting shown in place in a floor opening.

Referring now to the drawings, wherein like reference numerals designate identical or corresponding parts throughout the several views, and more particularly to FIGS. 1a, 1b and 2, the feed-through fitting of the invention is seen to include a compartmentalized head assembly 10, a feed-through assembly 12, and a collapsible retaining clamp 14. As shown in FIG. 2, where the feed-through fitting of the invention is placed in an opening 16 formed in a concrete floor 18 having an essentially smooth top face 20 and a corrugated bottom face 22, the head assembly 10 is mounted on the top face 20 above the opening 16, usually in contact with floor tile or carpeting generally designated as 24.

The feed-through assembly 12 is seen to include a floor cup 26, a fire insulating barrier 28, and a tubular conduit 30. The collapsible retaining clamp 14 is mounted around the conduit 30. Additionally, a bottom floor box assembly designated generally by the numeral 34 is coupled to conduit 30.

Figure 3:
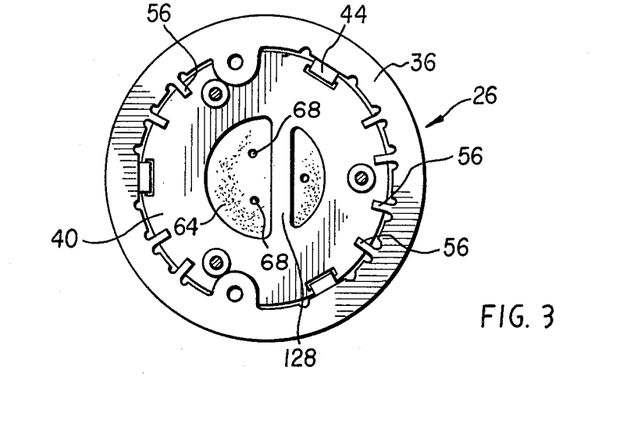
FIG. 3 is a horizontal cross-sectional view taken along the lines 3—3 of FIG. 2.

As shown in FIGS. 1–3, the floor cup is formed of two pieces, an apertured top flange 36 mounted over the opening 16 and supported around the periphery of the opening by the top floor face 20, and a cup bottom flange 40 coupled to the top flange 36. Integrally formed with the top flange 36 and extending perpendicularly therefrom into the opening in the vicinity of the sidewalls of the opening are leg members 38 spaced at common intervals around the inner perimeter of the top flange 36. More specifically, three leg members 38 are provided, thereby assuring mechanical integrity of the fitting while nevertheless reducing the number of thermal paths from the conduit 30 to the cup top flange 36 and the head assembly 10. Each of the leg members 38 is slotted with slot 42 in order to further reduce the thermal coupling of the fitting of the invention through the floor opening 16.

As shown in FIGS. 1 and 2, each of the leg members 38 are coupled to the floor cup bottom flange 40 by means of respective non-rigid mechanical connections. Details of these connections are shown in FIG. 3, where each of the leg members 38 is seen to include a pair of feet members 42 abutting the cup bottom flange 40 at opposed sides of the respective leg member 38. Each leg member 38 further includes a tab part 44 which is flanked by respective feet members 42 and which extends radially inwardly making minimal contact with the cup bottom flange 40. Each tab part 44 of a leg member 38 includes a lip part 46 which extends axially therefrom through a respective slot 48 formed in the cup bottom flange 40. The lip part 46 protrudes through the respective slot 48, and the protruding portion thereof is deformed radially such that the bottom flange is thereby non-rigidly coupled to the cup leg members 38.

As shown in FIGS. 1–3, the floor cup 26 is coupled to the compartmentalized head assembly 10 by means of the cup top flange 36, and additionally coupled to the conduit 30 by means of the cup bottom flange 40. The coupling of the top flange 36 to the compartmentalized head assembly is now described by reference to FIG. 1a and 1b. As shown in these figures, the head assembly 10 includes an apertured base member 50 having arcuate collar portions 52a, 52b, extending perpendicularly therefrom. The cup top flange 36 includes a peripheral portion 54 circumscribing a concentrically disposed aperture through which the arcuate collar portions 52a, 52b, of base member 50 are inserted to protrude into the floor cup 26 and extend below the level of the top face 20 of the floor 18. Appending from the peripheral portion 54 of the top flange 36 are a plurality of integrally formed fingers 56 which extend radially inwardly and axially into the floor opening 16. The fingers 56 are equidistant from the center of a circle defined by the collar portions 52a, 52b, and have tip portions 58 which engage the arcuate collar portions 52a, 52b, of the head assembly base member 50. Thus, the fingers 56 centrally align the collar portions 52a, 52b, in the floor cup 26, and enhance the ability of the head assembly 10 to sustain any lateral forces applied thereto. Any such lateral forces on the head assembly 10 are transmitted through the collar portions 52a, 52b, and the fingers 56 to the floor cup top flange peripheral portion 54. The peripheral portion 54 of the top flange 36 is, however, in frictional engagement with the floor top face 20 and is therefore able to resist lateral forces by means of the frictional forces thereby generated between the floor cup top flange 36 and the building floor 18. Thus, the engagement of the collar portions 52a, 52b, with the fingers 56 of top flange 36 permit the use of relatively small fastening means to attach the base member 50 to the floor cup 26, while nevertheless maintaining the ability of the fitting of the invention to resist movement when even a relatively large lateral force is applied to the head assembly. This relatively small fastening means between the cup top flange 36 and the base member 50 is achieved by means of fastening screws 60 protruding through holes formed in the base member 50 to engage threaded openings 61 provided in the cup top flange 36.

It is noted that the interference fingers 56 of the cup top flange 36 perform an additional desirable function in that they provide a good thermal path between the floor cup and the fitting head assembly 10. This condition is desirable in performing a fire test, or when the fitting is in an actual fire. Under those circumstances, the cup top flange 36 which is in a relatively hot area may be in contact with combustible floor coverings 24, while the head assembly 10 is instead in a relatively cool area. Thus, it is desirable to transfer heat from the cup top flange 36 to the fitting head assembly 10 in order to heat sink the cup flange 36 and to thereby extend the time in which the cup flange 36 reaches temperatures that could otherwise ignite the floor covering materials 24 through spontaneous combustion. Yet another function of the floor cup 26 of the invention resides in the space provided between the cup top flange 36 and the cup bottom flange 40, which space is used to store excess slack wire necessary to facilitate the connection of wires (not shown) to receptacles (not shown) mounted in the compartmentalized head assembly 10.

As shown in FIG. 2, a fire insulating barrier 28 is retained between the cup bottom flange 40 and the conduit 30 in order to retard the spread of fire through the floor opening 16. For the purpose of reducing the thermal conductivity of the fitting of the invention, and for retaining the insulating barrier between the conduit 30 and the floor cup bottom flange 40, a conduit flange 67 is non-rigidly coupled to the conduit 30 as discussed in more detail hereinafter, such that the fire insulating barrier 28 is retained between the bottom flange 40 and the conduit flange 67.

The fire insulating barrier 28 includes a cold smoke gasket 64 mounted adjacent and beneath the cup bottom flange 40, and plural intumescent wafers 66 disposed between the smoke gasket 64 and the conduit flange 67. The smoke gasket 64 is made of silicon rubber or other suitable material having low thermal conductivity, and completely blocks the aperture formed in the bottom flange 40 except for small holes 68 formed in the gasket 64 for the passage of wires therethrough. Each of the intumescent wafers 66 is concentrically apertured to permit passage of wires therethrough and is formed of suitable intumescent materials which foam and expand when subjected to elevated temperatures to effectively block off and fill the entire cross-sectional area of the opening 16 formed in the floor 18. Specific intumescent materials are well known in the art, with specific examples thereof being disclosed in U.S. Pat. No. 3,864,883 to McMarlin. Low thermal conductivity spacer-shafts 70 are employed to hold the bottom flange 40 and the conduit flange 67 of the fitting together. The spacer-shafts 70 are shouldered to provide a rigid structure, with or without the intumescent wafers 66 in place. Thermal conductivity from the spacer-shafts 70 to the cup bottom flange 40 is further reduced by the use of insulating washers 72 on both sides of the cup bottom flange 40 separating the cup bottom flange 40 from the shafts 70. Additionally each of the spacer-shafts 70 have rivet-like end portions, which are necked down relative to the spacer-shaft central portion, for connections of these smaller diameter rivet-like end portions to the flanges 40 and 67, thereby further reducing thermal conductivity. Three spacer-shafts 70 circumferentially spaced apart at 120° intervals are provided, thereby assuring three dimensional mechanical stability, with minimum thermal conductivity. Although four spacer-shafts 70 would also provide mechanical stability, the thermal conductivity would be proportionately increased. Thus the use of three spacer-shafts 70 represents an optimum configuration from a thermal and a mechanical standpoint.

Various additional measures for further reducing the overall thermal conductivity of the fitting of the invention have been considered. To that end the invention contemplates the interruption of the thermal path through the fitting by the use of non-rigid mechanical interconnections wherever feasible. One such non-rigid mechanical interconnection, the details of which are disclosed in commonly owned copending U.S. patent application by Ehrenfels, Ser. No. 048,824, filed June 15, 1979, now U.S. Pat. No. 4,243,835, incorporated by reference herein, loosely couples the conduit flange 67 to the conduit 30, as illustrated in FIG. 4.

Figure 4:
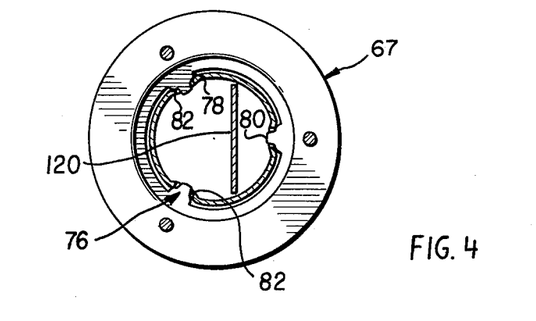
FIG. 4 is a horizontal cross-sectional view taken along the lines 4—4 of FIG. 2.
Figure 5:
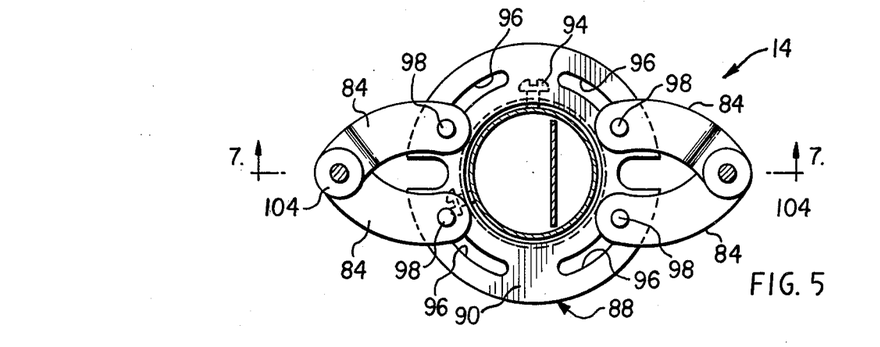
FIG. 5 is a horizontal cross-sectional view taken along the lines 5—5 of FIG. 2.

Referring now to FIG. 4, the conduit flange 67 is seen to include a peripheral portion 74 circumscribing an aperture having a diameter larger than the diameter of the conduit 30. Formed integrally with the peripheral portion 74 are plural tabs 76 extending radially inwardly into the conduit flange aperture. The tabs 76 are spaced at common intervals around the circumference of the aperture, with three tabs being provided to assure adequate mechanical stability with minimal thermal conductivity. Each of the tabs are provided with shoulder portion 78, each having a lip portion 80 centered in the shoulder portion and further extending radially inwardly therefrom. The conduit 30 is provided with plural slots 82 formed in the vicinity of an end of the conduit and in a common transverse plane at intervals corresponding to the spacing of the conduit flange tabs 76. The shoulder portion 78 of a tab 76 has a width slightly greater than the width of the corresponding conduit slot 82, such that each tab shoulder portion 78 abuts the opposed edges of a corresponding conduit slot 82, with the respective lip portions 80 inserted in the conduit slot 82. Thus, the conduit flange 67 is axially retained by means of the lip portions 80 of the tab 76 protruding into the conduit slots 82, with minimal contact, and therefore thermal conductivity, between the conduit 30 and the conduit flange 67 being made at the edges of the tab shoulder portion 78. As a result, the inner periphery of the peripheral portion of the conduit flange 67 is spaced apart from the conduit 30, with thermal coupling therebetween being minimized by the non-rigid loose mechanical coupling between the tab shoulder portion 74 and the opposed edges of the conduit slots 82. Another conduit flange 62, FIG. 2, similar to the flange 67 couples the floor box assembly 34 to the bottom end of the conduit 30.

Nextly referring to FIGS. 1a, 1b, 6 and 7, the details of the improved collapsible retaining clamp 14 of the invention is described. This collapsible retaining clamp 14 provides an integral means of fastening the conduit 30 to the underside of the building floors of various thicknesses with either smooth or corrugated surfaces. Clamp 14 includes opposed pairs of collapsible arms 84 which allow the fitting of the invention to be inserted in a floor opening 16 of a prescribed size, after which the arms 84 are extended so that fastening screws 86 at the ends of the arm pairs are beyond the diameter of the floor opening, such that upon tightening of the fastening screws 86 and engagement therewith with the bottom floor face 22, the floor 18 is effectively clamped between the cup top flange 36 and the fastening screws 86 to maintain the feed-through fitting of the invention firmly in place within the floor opening 16.

Figures 6A, 7:
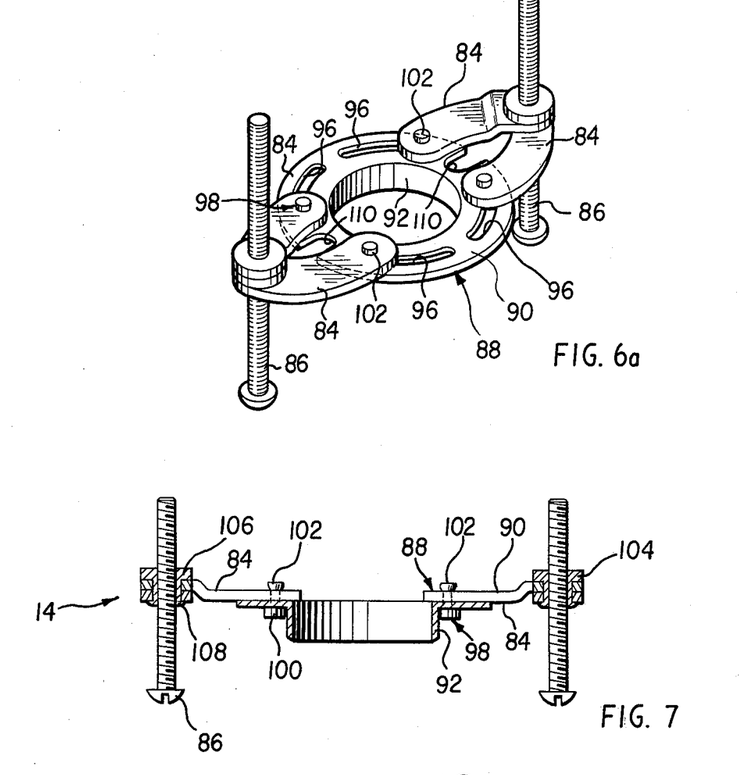
FIG. 6a is a perspective view of the retaining clamp of the invention, illustrating the clamp with extended clamping arms.
FIG. 7 is a vertical cross-sectional view taken along the lines 7—7 of FIG. 5.
Figure 6B:
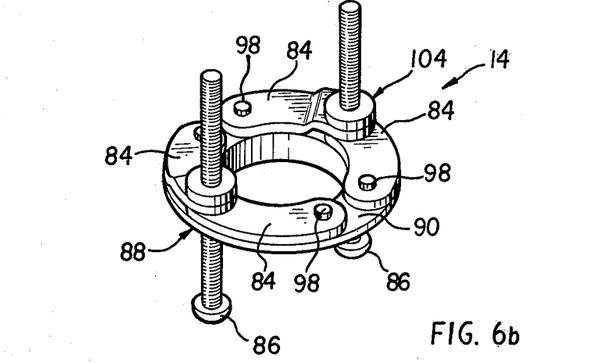
FIG. 6b is a perspective view of the retaining clamp of the invention illustrating the clamp with retracted clamping arms.

The collapsible arms 84 of the retaining clamp 14 of the fitting of the invention are mounted at one end thereof on a carrier ring 88 which includes a retaining flange 90 circumscribing an aperture having a minimum transverse dimension larger than the maximum transverse dimension of the conduit. Integrally formed with the retaining flange 90 and appending perpendicularly therefrom is a retaining collar 92 surrounding the conduit 30. The retaining collar 92 is provided with plural threaded holes in which are disposed respective set screws 94 by which the retaining collar 92 is secured to the conduit 30. Thus, the carrier ring 88 is free to slide axially along the conduit to accommodate floors of varying thicknesses, and is free to rotate around the conduit 30 to allow positioning of the fastening screws 86 on a bottom floor face surface perpendicular to the respective fastening screws 86. This prevents any side loading of the fastening screws 86 which could eventually otherwise lead to loosening of the fitting of the invention. Upon establishing the positioning of the carrier ring 88, the carrier ring 88 is secured to the conduit 30 by means of set screws 94 provided in the retaining collar 92 thereof. Three set screws 94 are positioned at common intervals in the collar 92 to provide three point fastening to the tube, thereby minimizing any potential rocking of the collar 92.

As noted above, and as shown in the drawings, opposed pairs of retractable arms 84 are mounted on the retaining flange 90 of carrier ring 88 by means of slots 96 provided in the retaining flange 90 and by means of hinge pins 98 which couple both the ends of adjacent pairs of retractable arms 84 and the retaining flange slots 96. Thus the ends of adjacent pairs of retractable arms 84 are slidably coupled to the retaining collar 92 by means of the hinge pins 98. The hinge pins 98 have a head portion 100 at one end thereof and a deformable end portion 102 at the other end thereof, which deformable end portion 102 is deformed upon assembly to achieve the slidable coupling of the retractable arms 84 with respect to the retaining flange slots 96. In a preferred embodiment, steel hinge pins 98 are used.

The other ends of the adjacent retractable arms 84 are coupled to the fastening screws 86 by means of boss members 104. The boss members 104 have a head portion 106, and an internally threaded cylindrical portion 108 extending from the head portion through holes formed in the other ends of the retractable arms 84. The threaded cylindrical boss portion 108 is then peened against the bottom side of the retaining flange 90 with both arms 84 of an adjacent arm pair journaled around the boss member 104 between the boss head 106 and the peened end of the cylindrical portion 108. The fastening screws 86 are then disposed in the threaded openings of the boss members 104 and independently adjustable therethrough to accommodate smooth or corrugated floor bottom faces 22. As shown in FIG. 6a, additional retraction slots 110 are formed between adjacent retaining flange slots 96 to accommodate maximum radial retraction of the fastening screws 86, as shown in FIG. 6b, for insertion of the fitting of the invention through the floor opening 16.

It is noted that the fastening screws 86 can be of sufficient length to accommodate the deepest floor corrugation anticipated, or can be made of a shorter length and then provided with an extender pin 85. This extender pin can then be put on or taken off the fastening screw 84 as floor opening location and corrugation depth dictate.

It is further noted that the utility of the retaining clamp 14 of the invention, when used on floors with corrugated bottom faces 22, depends upon the fastening screws 86 being able to rotate in an arc of approximately 180°. Therefore, the conduit 30 need not necessarily be cylindrical, but can assume other shapes so long as the conduit cooperates with the retaining collar 92 to produce requisite set screw locations for securing of the carrier ring 88 to the conduit. Similarly, with regard to the relative dimensioning of the conduit flange 62 with respect to the conduit 30, it is noted that conduits 30 of different cross-sectional shapes can be employed, so long as the conduit flange is suitably spaced from the conduit 30 by means of conduit tabs 76 dimensioned to engage the corresponding conduit slots 82.

The above embodiment described with respect to FIGS. 1-7 has been found to maintain a temperature of 325° F. above the starting ambient temperature at the top floor face 20 for a period of one hour upon subjection of the bottom floor face 22 to a temperature of about 1,800° F. In another preferred embodiment of the fitting of the invention, the fire insulating barrier is split into two portions for fittings used on all but the thinnest floors. This way, the overall efficiency of the fire-barrier is improved in regard to reduced heat transfer by providing an air gap between the two portions of the fire barrier. By these means, it has been possible to maintain a maximum temperature of 325° F. above the starting ambient temperature at the floor top face while subjecting the floor bottom face 22 to a temperature of about 2,200° F. for a period of four hours, such that the second embodiment of the invention clearly meets this stringent performance specification established by Underwriters Laboratories.

In the second preferred embodiment of the invention noted above and partially shown in FIG. 8, the conduit 30 is formed of at least two sections, with each section having respective conduit flanges non-rigidly coupled thereto as described hereinabove. Assuming two conduit sections, 112 and 114, four conduit flanges 62a-62d are then used. As discussed above, disposed between bottom flange 40 of the floor cup and a first conduit flange 62a attached to one end of the first conduit section 112 is disposed the first fire insulating barrier 28. Then, a second fire insulating barrier 116 is disposed between a conduit flange 62b non-rigidly attached to the opposite end of the first conduit section 112 and a third conduit flange 62c attached to one end of the second conduit section 114.

Figure 8:
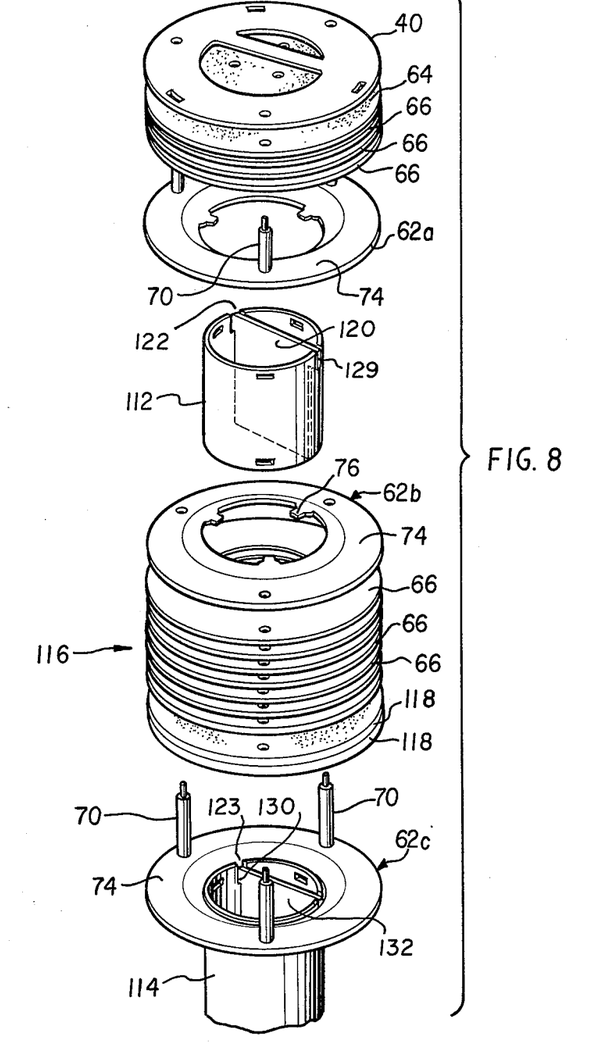
FIG. 8 is a fragmentary partially exploded perspective view of a portion of a second embodiment of the invention illustrating a fitting conduit interrupted by a second fire insulating barrier.

The second fire insulating barrier 116 optimally includes at least one fibrous non-intumescent ceramic wafer 118 adjacent the third conduit flange 62c attached to the end of the second conduit section 114 to provide an axial temperature drop great enough to minimize the possibility of the intumescent material melting when the fire temperature exceeds the melting temperature of the ceramic insulating wafer 118. For this purpose, the at least one ceramic wafer 118 completely overlaps the conduit aperture except for small holes provided therein for passage of wires therethrough. Supported above the ceramic wafer 118 are plural stacked intumescent wafers 66 extending to just below the second conduit flange 62b. Each of the intumescent wafers 66 of the second insulating barrier 116, as well as the intumescent wafers of the first insulating barrier 28, are separated by spacing means which is the subject of a separate patent application by Babey, commonly owned by the assignee of this application, Ser. No. 048,724, filed June 15, 1979 and now abandoned. The at least one ceramic wafer 118 is provided to assure that with temperatures of about 2,200° F. at the bottom floor face 22, the intumescent wafers 66 are exposed to a maximum temperature less than about 1,800° to avoid disintegration thereof. The ceramic wafer 118 and the intumescent wafer 66 of the second fire insulating barrier 116 are maintained in place between the conduit flanges 62b, 62c by shouldered rivets. Obviously, plural ceramic wafers 118 can be stacked to improve the thermal barrier thereby provided.

Another feature of the fitting of the invention involves the provision of separate wiring paths for power lines and telecommunication or other wires through the fitting. To that end, conduit dividers 120 and 132 are provided axially within the conduits 112 and 114, respectively along the length thereof, and supported by slots 122 and 123, respectively, formed in the conduit sections 112, 114 (or 30). The conduit dividers 120 and 132 are typically rectangular in shape except for ear portions 129 and 130, respectively, extending radially outwardly in the vicinity of the conduit slots 122 and 123, respectively whereby the conduit dividers are supported by the respective conduit sections. Optionally, the conduit dividers may be provided with intumescent materials attached thereto.

Also, to maintain separate wiring pass-through the floor cup 26 and the compartmentalized head assembly 10, the assembly 10 is provided with a dividing member 124 on which is slidably mounted a dividing plate 126 extending from the head dividing member 124 to abut against a cup dividing member 128 integrally formed in the cup bottom flange 40 and spanning the cup bottom flange aperture. Thus, by coupling slotted openings 130 formed in the dividing plate 126 by means of headed fixed fasteners 132 mounted in the head dividing member 124, compartment separation is maintained throughout the range of expected carpet thicknesses, since as the head assembly 10 moves upwardly due to the varying carpet thicknesses, the dividing plate 126 slides downwardly to be supported by the cup dividing member 128 to maintain the requisite separation. Optionally, the barrier plate 126 is removable to allow passage of wires for dual power or dual telecommunication installations.

Figure 9:
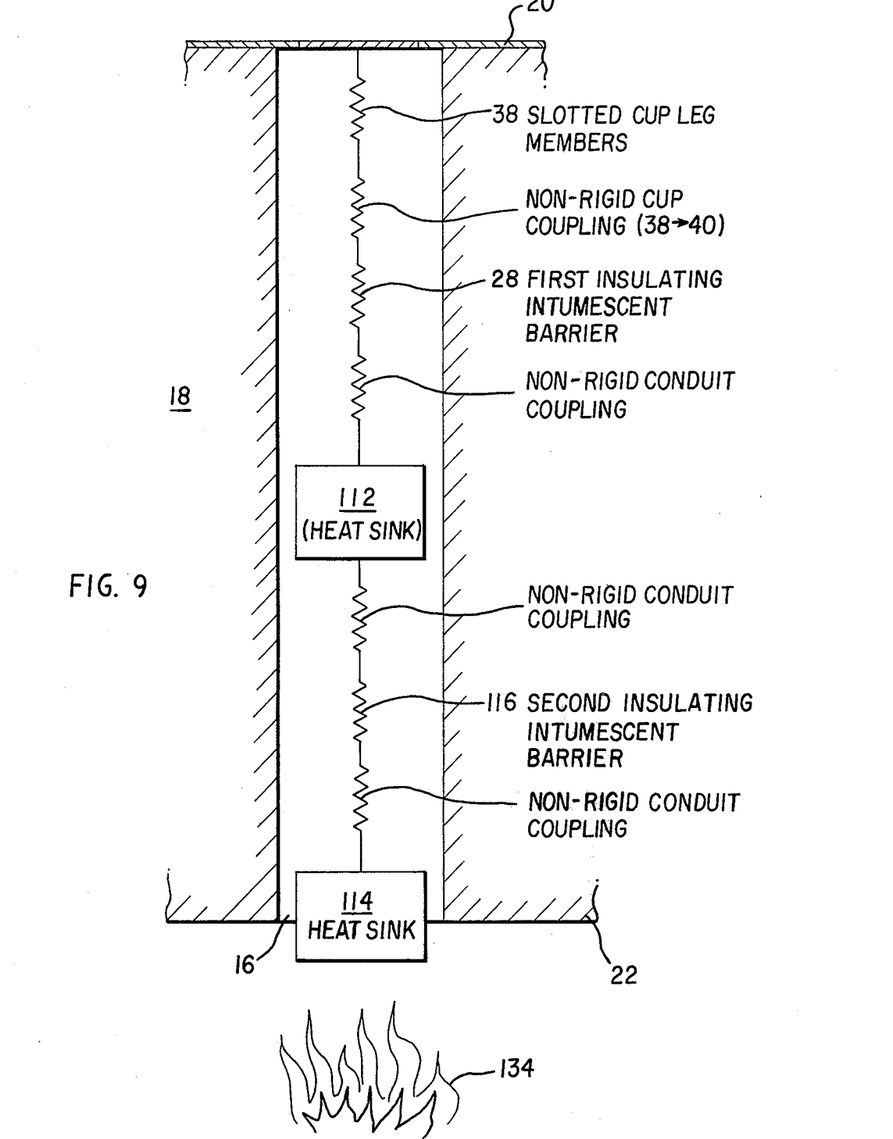
FIG. 9 is an analogous circuit representation of the fitting of the invention illustrating the serial thermal impedances provided by the embodiment shown in FIG. 8.

From the above discussion, it is seen that the feed-through fitting according to the invention is designed to minimize thermal conductivity through a floor opening 16 in order to retard if not prevent the spread of fire through the floor opening 16. This reduction in thermal conductivity is achieved by means of the non-rigid generally loose mechanical interconnections provided in the feed-through fitting. These non-rigid interconnections effectively interrupt the thermal path and conceptually increase the thermal impedance of the fitting. This concept is visualized in FIG. 9 where the various elements of the invention are reduced to an analogous circuit representation illustrating the basis for the improved thermal performance of the invention. From FIG. 9, it is seen that with the heat source 134 applied to the lower conduit section 114, which in effect acts as a heat sink, the thermal conductivity from the conduit heat sink 114 to the conduit heat sink 112 is clearly reduced by the thermal impedance provided by the non-rigid conduit flange/conduit interconnections, and the insulating barrier 116 provided therebetween. Similarly, from the conduit heat sink 112 to the opposite floor face 20, plural additional thermal impedances are inserted in series therebetween, as represented by the conduit flange/conduit interconnection, the insulating barrier 28, the non-rigid cup bottom flange/cup leg members interconnection, and the slotted leg members 38. Thus, it is seen that each of these thermal impedences provided by the various fitting interconnections are disposed serially to effectively reduce thermal conductivity through the floor opening 16 from the floor bottom face 22 to the floor top face 20.

Obviously, numerous modifications and variations of the present invention are possible in light of the above teachings. For example, it is specifically noted that while cylindrical conduits are shown in the drawings, other shapes are possible, provided that the conduit flanges 62 and retaining clamp 14 are shaped accordingly. Furthermore, conceivably each of the conduits also can be selectively slotted to further reduce the heat sinking capability thereof, thereby reducing the overall thermal conductivity of the fitting of the invention. It is therefore to be understood that within the scope of the appended claims, the invention may be practiced otherwise than is specifically described herein.

What is claimed as new and desired to be secured by Letters Patent of the United States is:

1. The combination of a portion of a floor and a fitting feeding insulated wires through an opening in such portion of the floor, whereby electrical power and/or other signals are transmitted via the wires between one face of said floor through said fitting mounted in said opening to respective connector means connected to the wires on the opposite face of said floor, comprising:
   a head assembly located above the opening on the opposite floor face, the connector means associated with said head assembly;
   a feed-through assembly disposed in said floor opening and coupled to said head assembly, comprising,
   a floor cup supported on the opposite floor face and extending into said opening, said cup coupled to said head assembly and aiding the location of said head assembly over said floor opening, said cup storing excess of wire after connection of the wires to the connector means, said cup comprising apertured top and bottom substantially parallel flanges, said flanges being separated in a substantially perpendicular direction relative to the planes of the flanges with the top flange located closer to the opposite floor face than the bottom flange and the bottom flange located closer to the one floor face than the top flange;
   a plurality of discrete, elongated support members for securing said top and bottom flanges together in said separated relationship, said support members extending perpendicularly relative to the planes of said flanges and located at spaced-apart positions relative to one another about said flanges;
   a tubular conduit coupled to said bottom flange for feeding the wires from said one floor face to said floor cup;
   first insulating barrier means disposed between said bottom flange and said conduit for retarding the spread of fire through said opening;
   said conduit having a sufficient length to extend at least to the one face opening of the floor;
   retaining clamp means coupled to said conduit, and having means for engaging the one face of said floor, for securing said fitting to said floor.

2. The combination according to claim 1, further comprising:
   non-rigid joint means for loosely mechanically coupling said cup to said conduit.

3. The combination according to claim 2, wherein said floor cup comprises:
   said apertured top flange defining a transverse plane and having means for coupling said top flange to said head assembly, said top flange supported on the opposite face of said floor around the periphery of said opening
   said support members comprising plural integrally formed leg members extending perpendicularly from said top flange into said floor opening; and,
   said apertured bottom flange non-rigidly coupled to said plural leg members.

4. The combination according to claim 3 wherein said non-rigid joint means comprises:
   an annular apertured conduit flange non-rigidly coupled to said conduit, said insulating barrier means disposed between said conduit flange and said cup bottom flange; and,
   means for retaining said insulating barrier means between said conduit flange and said bottom flange and for coupling said bottom flange to said conduit flange.

5. The combination according to claim 4, wherein said means for retaining said insulating barrier means and for coupling said cup bottom flange to said conduit flange comprises:
   a trio of spacer-shafts each having one end coupled to said cup bottom flange and another end coupled to said conduit flange, said spacer-shafts circumferentially spaced at substantially common 120° intervals around the annular conduit flange and oriented axially between said conduit flange and said cup bottom flange.

6. The combination according to claim 5, wherein each spacer-shaft comprises:
   a central portion; and
   end portions separated by said central portion;
   wherein the end portions have a smaller diameter than the central portion to reduce the thermal conductivity of said spacer-shaft.

7. The combination according to claim 6, further comprising:
   plural insulating washers disposed at said one end of said spacer-shafts abutting both sides of said cup bottom flange to insulate the connection of said spacer-shafts to said cup bottom flange.

8. The combination according to claim 6, further comprising:
   said conduit formed of at least two sections including a first conduit section having first and second of said conduit flanges non-rigidly coupled to opposed ends of said first section, said first conduit flange coupled to said cup bottom flange, and a second conduit section having third and fourth of said conduit flanges disposed at opposite ends of said second section, said third conduit flange coupled to said second conduit flange and separated therefrom by a gap;
   second insulating barrier means disposed in said gap between said second and third conduit flanges for retarding the spread of fire through said opening;
   means for coupling said second conduit flange to said third conduit flange and for retaining said second insulating barrier means therebetween.

9. The combination according to claim 8 wherein said second insulating barrier means comprises:

at least one ceramic insulating gasket disposed adjacent said third conduit flange between said second and third conduit flanges; and plural stacked intumescent barriers disposed between said at least one ceramic gasket and said second conduit flange.

10. The combination according to claim 4 wherein said insulating barrier means comprises:

a cold smoke gasket of substantially rectangular, cross-sectional shape and of low thermal conductivity disposed adjacent said cup bottom flange; and, at least one intumescent barrier disposed between said conduit flange and said cold smoke gasket.

11. The combination according to claim 3, further comprising:

said cup top flange comprising a peripheral portion defining a concentrically disposed aperture, said top flange peripheral portion having a plurality of integrally formed fingers extending radially inwardly and axially into said floor opening a predetermined distance, said fingers having tip portions equidistant from the center of said top flange;

said head assembly comprising an apertured base member having arcuate collar portions extending perpendicular therefrom and protruding into said cups beyond the tips of said fingers and in tight engagement therewith; and fastening means for securing said head assembly base member to said cup top flange.

12. The combination according to claim 3, further comprising:

said cup leg members having slots formed therein to reduce the thermal conductivity of said leg members. 2

13. The combination according to claim 3, further comprising:

said bottom flange comprising an outer peripherial portion circumscribing a concentrically disposed aperture, said bottom flange outer portion having plural slots formed therein and positioned to engage said leg members of said top flange;

each of said leg members at the ends thereof having feet members abutting said bottom flange, a tab part flanked by said feet members and extending radially inwardly towards the center of said opening and a lip part extending axially through a respective slot formed in said intermediate flange, said lip part having a portion thereof protruding through said respective slot, which protruding portion is deformed radially such that said bottom flange is non-rigidly coupled to said leg members.

14. The combination according to claim 3, further comprising:

said conduit having a first divider axially defining at least one pair of conduit paths for leading wires to said head assembly;

said cup bottom flange having a second divider integrally formed and spanning the cup bottom flange aperture to define said at least one pair of conduit paths through said cup bottom flange aperture;

said head assembly being compartmentalized and comprising a compartment divider defining at least one compartment for each conduit path, and an adjustable divider coupled to said compartment divider and supported by said second divider to maintain separation of wires passed through said at least one pair of conduit paths through said cup.

15. The combination according to claim 1, further comprising:

said retaining clamp means rotatable around said conduit and slidable along said conduit to enable securing of said fitting to floors of differing thickness; and, means for securing said retaining clamp means to said conduit after sliding adjustment of said retaining clamp means along said conduit.

16. The combination according to claim 15, wherein said retaining clamp means comprises:

a carrier ring comprising a retaining flange circumscribing an aperture having a minimum transverse dimension larger than the maximum transverse dimension of said conduit, and a retaining collar integrally formed and appending perpendicularly from said retaining flange around the perimeter of the retaining flange aperture to surround said conduit;

said retaining collar having formed therein plural threaded holes facing said conduit;

plural set screws disposed in the holes of said retaining collar by which said retaining collar is secured to said conduit;

retractable clamping means mounted on said retaining flange for engaging the opposite face of said floor to clamp said floor between said cup top flange and said retractable clamping means.

17. The combination according to claim 16 wherein said retractable clamping means comprises:

said retaining flange having formed therein adjacent pairs of commonly spaced arcuate slots;

two pairs of arcuate shaped arms, each arm of a respective arm pair having one end slidably retained in a respective adjacent retaining flange slot and another end pivotably coupled to the another end of the other arcuate-shaped arm of the respective arm pair;

means for slidably retaining each of said arms in a respective retaining flange slot;

means for pivotably coupling the another ends of the arms of each said pairs of arms, said pivotably coupling means having a thread opening;

threaded pins coupling the threaded opening of said pivotably coupling means, said pins engaging said opposed face of said floor upon advance through respective threaded holes, whereby said floor is clamped between said floor cup and said threaded pins.

18. The combination of a portion of a floor and a fitting feeding insulated wires through an opening in such portion of the floor whereby electrical power and other signals are transmitted via said wires from a source located at one face of said floor through said fitting mounted in said opening to respective connective means connected to said wires and mounted on a head assembly disposed on the opposite face of said floor, the improvement comprising:

a floor cup supported on the opposite floor face and extending into said opening, said cup coupled to said head assembly and positioning said head assembly with respect to said floor opening, said cup storing excess of said insulated wires after connection of said wires to said respective connective means, said cup comprising a pair of parallel flanges interconnected by discrete support members disposed between said flanges in directions substantially perpendicular to the planes of said flanges and located at spaced-apart positions relative to one another about said flanges;

means disposed between said cup and said source for retarding the spread of fire through said opening; and means for securing said fitting to said floor.

19. The combination according to claim 18, wherein said floor cup comprises:

an apertured top flange defining a transverse plane and having means for coupling said cup to said head assembly, said top flange supported on the opposite face of said floor around the periphery of said opening and having plural integrally formed leg members extending perpendicular to the transverse plane into said floor opening; and, an apertured bottom flange non-rigidly coupled to said plural leg members of said top flange.

20. The combination according to claim 19, further comprising:

said bottom flange comprising an outer peripheral portion circumscribing a concentrically disposed aperture, said bottom flange outer portion having plural slots formed therein and positioned to engage said leg members of said top flange;

each of said leg members at the ends thereof having feet members abutting said bottom flange, a tab part flanked by said feet members and extending radially inwardly towards the center of said opening, and a lip portion extending axially through a respective slot formed in said intermediate flange, said lip part having a portion thereof protruding through said respective slot, which protruding portion is deformed radially such that said bottom flange is non-rigidly coupled to said leg members.

21. The combination according to claim 19, further comprising:

said cup top flange comprising a peripherial portion defining a generally circular concentrically disposed aperture, said top flange peripheral portion having a plurality of integrally formed fingers extending radially inwardly and axially into said floor opening a predetermined distance, said fingers having tip portions equidistant from the center of said top flange;

said head assembly comprising an apertured base member having arcuate collar portions extending perpendicular therefrom and protruding into said cups beyond the tips of said fingers and in tight engagement therewith; and fastening means for securing said head assembly base member to said cup top flange.

22. The combination according to claim 19, further comprising:

said cup leg members having slots formed therein to reduce the thermal conductivity of said leg members.

23. The combination of a portion of a floor having a circular opening extending therethrough and a fitting mounted in said opening feeding insulated wires by which electrical power and/or other signals are transmitted between one face of said floor via the wires through said fitting to respective connector means connected to the wires and associated with a head assembly of said fitting disposed on the opposite face of said floor, the improvement comprising:

a wire conduit disposed in said floor opening;

non-rigid joint means for loosely mechanically coupling said fitting head assembly to said conduit for minimizing the conduction of heat therebetween, said non-rigid joint means including a bottom flange;

first insulating barrier means disposed between said bottom flange and said conduit for retarding the spread of fire through said opening, said barrier means having an aperture extending therethrough for the passage of wires in the fitting;

elongated metallic conduit partition means mounted in said conduit longitudinally thereof, whereby the wires transmitting the power and the other signals can be respectively partitioned in said conduit, said partition means having two ends, the end closest to said barrier means extending near but not through said barrier means, whereby thermal conduction directly through said aperture by way of conduction through said partition means is inhibited; and, means for securing said fitting to said floor.

24. The combination according to claim 23, wherein said non-rigid joint means comprises:

an annular apertured conduit flange non-rigidly coupled to said conduit, said insulating barrier means disposed between said conduit and said bottom flanges; and, means for retaining said insulating barrier means between said conduit and said bottom flanges and for coupling said bottom flange to said conduit flange.

25. The combination according to claim 24, wherein said means for retaining said insulating barrier means and for coupling said cup bottom flange to said conduit flange comprises:

a trio of spacer-shafts each having one end coupled to said bottom flange and another end coupled to said conduit flange, said spacer-shafts circumferentially spaced at common 120° intervals around the annular conduit flange and oriented axially between said conduit flange and said bottom flange.

26. The combination according to claim 25, wherein each spacer-shaft comprises:

a central portion; and end portions separated by said central portion;

wherein the end portions have a smaller diameter than the central portion to reduce the thermal conductivity of said spacer-shafts.

27. The combination according to claim 26, further comprising:

plural insulating washers disposed at said one end of said shaft abutting both sides of said bottom flange to insulate the connection of said shaft to said bottom flange.

28. The combination according to claim 24 wherein said insulating means comprises:

a cold smoke gasket of a substantially rectangular, crosssectional shape and of low thermal conductivity disposed adjacent said bottom flange; and, at least one intumescent barrier disposed between said conduit flange and said cold smoke gasket.

29. The combination according to claim 24, further comprising:

said conduit formed of at least two sections including a first conduit section having first and second of said conduit flanges non-rigidly coupled to opposed ends of said first section, said first conduit flange coupled to said bottom flange, and a second conduit section having third and fourth of said conduit flanges disposed at opposite ends of said second section, said third conduit flange coupled to said second conduit flange and separated therefrom by a gap;

second insulating barrier means, disposed in said gap between said second and third conduit flanges for retarding the spread of fire through said opening;

means for coupling said second conduit flange to said third conduit flange and for retaining said second fire retarding means therebetween.

30. The combination according to claim 29 wherein said second insulating barrier means comprises:

at least one ceramic insulating gasket disposed adjacent said third conduit flange between said second and third conduit flanges; and plural stacked intumescent barriers disposed between said at least one ceramic gasket and said second conduit flange.

31. The combination of a portion of a floor and a fitting feeding insulated wires through an opening in such portion of the floor, whereby electrical power and/or other signals are transmitted from a source located at one face of said floor via the wires through said fitting mounted in said opening to respective receptacles or other devices connected to the wires and mounted on a head assembly of said fitting disposed on the opposite face of said floor, the improvement comprising:

an elongated wire conduit disposed in said floor opening;

a top flange supported on the opposite floor face and secured to said head assembly to maintain said head assembly over said floor opening;

first insulating barrier means disposed between said top flange and said conduit for retarding the spread of fire through said opening;

elongated conduit partition means mounted in said conduit longitudinally thereof, whereby the wires for transmitting the power and the other signals can be partitioned in said conduit, said partition means having two ends, the end closest to said barrier means extending near but not through said barrier means thereby inhibiting thermal conduction directly through said barrier means by conduction through said partition means;

retaining clamp means coupled to said conduit, and having means for engaging the one face of said floor, for securing said fitting to said floor, said retaining clamp means rotatable around said conduit and slidable along said conduit to enable securing of said fitting to floors of differing thickness; and, means for securing said retaining clamp means to said conduit 32. The combination according to claim 31 wherein said retaining clamp means comprises:

a carrier ring comprising a retaining flange circumscribing an aperture having a minimum transverse dimension larger than the maximum transverse dimension of said conduit, and a retaining collar integrally formed and appending perpendicularly from said retaining flange around the perimeter of the retaining flange aperture to surround said conduit;

said retaining collar having formed therein plural threaded holes facing said conduit;

plural set screws disposed in the holes of said retaining collar by which said retaining collar is secured to said conduit;

retractable clamping means mounted on said retaining flange for engaging the opposite face of said floor to clamp said floor between said cup and said retractable clamping means.

33. The combination according to claim 32, wherein said retractable clamping means comprises:

said retaining flange having formed therein adjacent pairs of commonly spaced arcuate slots;

two pairs of arcuate shaped arms, each arm of a respective arm pair having one end slidably retained in a respective adjacent retaining flange slot and another end pivotably coupled to the another end of the other arcuate-shaped arm of the respective arm pair;

means for slidably retaining each of said arms in a respective retaining flange slot;

means for pivotably coupling the another ends of the arms of each said pairs of arms, said pivotably coupling means having a threaded opening;

threaded pins respectively coupling the threaded openings of said pivotably coupling means, said pins engaging said opposed face of said floor upon advance through respective threaded holes, whereby said floor is clamped between said floor cup and said threaded pins.

34. The combination of a substantially cylindrical structural opening formed in a floor of a building and a feed-through fitting for feeding insulated wires through the opening by which electrical power and/or other signals are transmitted between the lower surface of said floor via said wires through said fitting mounted in said opening to respective connective devices connected to said wires and mounted on a service head assembly of said fitting disposed on the upper surface of said floor, the improvement comprising:

a planar upper flange portion secured to said head assembly and having an aperture extending therethrough for the passage of wires, said upper flange portion being spaced from a wall defining said opening;

a first partition member in said head assembly having respective upper and lower end portions, means for mounting the upper end portion of said first member on said head assembly for adjustment in a plane substantially perpendicular to the plane of said upper flange portion, whereby said head assembly may be adjusted relative to said first partition member;

a planar lower flange portion spaced from said upper flange portion substantially parallel thereto and from the wall of said opening, said lower flange portion having a wire-accommodating aperture therethrough;

an elongated second partition member coupled to said lower flange portion and having a longitudinal axis substantially perpendicular to the plane of said lower flange portion, said partition members being substantially aligned to define a plurality of wire passages extending from said lower to said upper flange portion; and, a third partition member mounted on said upper flange portion in substantial alignment with the lower end portion of said first partition member for partitioning the wires to said first partition member, an intumescent member composed at least in part of an intumescing composition and positioned between said flange portions, said member spaced from the wall defining said opening to provide space for expansion of said member upon the intumescing thereof, said member having at least one aperture extending therethrough in substantial alignment with an associated one of the wire passages in said upper and lower flange portions to provide a continuous passageway for wires in the fitting;

the aperture in said intumescent member being otherwise devoid of any other metallic members whereby thermal conduction between and around said flange portions is blocked by the intumescing expansion of said member.

35. The combination as in claim 34 wherein the partition members are elongated metallic strips of rectangular cross-sectional shape.

36. The combination as in claim 35 wherein the mounting means comprises a least one fastener device connected to said head assembly adjustable for fixing the position of said first partition member on said head assembly, said upper end portion of said first partition member having an elongated slot formed therein for accommodating said fastener device and allowing longitudinal displacement of said first partition portion relative to said head assembly.

37. The combination of a structural opening and a feed-through fitting for mounting in the structural opening the fitting including:

first and second metallic flange members having respective first and second circular surface portions mounted in opposed, spaced-apart relationship in the opening;

at least one intumescent member composed at least in part of an intumescent material positioned between said surface portions of said flange members, said intumescent member having an aperture extending therethrough to provide a passageway for loosely receiving the conductive wires between said inner ends of said conduits, said passageway being devoid of any members of good thermal conductivity except for the conductive wires;

first and second conduits for accommodating conductive wires in the fitting, each of said conduits having respective inner and outer ends, each of said outer ends of said conduits extending towards a different end of the structural opening;

means for mounting the inner ends of said first and second conduits in substantial alignment on said first and second flange members, respectively, whereby the inner ends of said conduits are spaced apart proximate opposite ends of said passageway through said intumescent member;

the wall defining the structural opening and said intumescent member providing a space around said flanges and the intumescent member prior to the intumescing thereof to facilitate the installation of the fitting in said opening;

the passageway through said intumescent member and said space filling with intumescent material after said member intumesces to provide a blockage to thermal conduction between said surface portions of said member which blockage extends to the wall of said opening.

38. The combination as claimed in claim 37 further comprising three, substantially equally spaced-apart shafts positioned intermediate of said passageway and said wall and extending through said intumescent plates for coupling said flange members together.

39. The combination as claimed in claim 37 or 38, wherein each of said shafts has a substantially smooth cylindrical portion between said flanges and a threaded end portion of smaller diameter than said cylindrical portion for making a threaded connection with one of said flange members.

40. A feed-through floor fitting comprising;

first and second metallic flange members having substantially concentric peripheral edges, said members having respective first and second opposing surface portions mounted in substantially parallel and opposed spaced-apart relationship;

a plurality of substantially parallel, intumescent plates positioned between said surface portions, said plates having an aperture extending substantially perpendicularly therethrough for receiving electrical conductor means insertable therein;

each of said flange members having an opening extending therethrough communicating with a different end of the aperture in said intumescent plates;

first and second conduits, each of said conduits having respective first and second ends;

means mounting the first ends of said first and second conduits on said first and second flange members, respectively, in substantial alignment with the corresponding flange openings, whereby said first ends of said conduits are spaced-apart at opposite ends of the aperture a distance substantially equal to the length of the aperture between the ends thereof;

a plurality of elements spaced-apart adjacent said peripheral edges of said flange members outwardly of said aperture in said plates for coupling said flange members;

said aperture being devoid of any body with the exception of the electrical conductor means inserted into said aperture, (1) having good thermal conductivity and extending at least the length of the aperture between said flanges, or (2) which prevents intumescing of the material of said member from closing said aperture.

41. A feed-through floor fitting comprising;

first and second flanges having respective first and second opposing surface portions mounted in opposed, spaced-apart relationship;

a member composed at least in part of an intumescent material positioned between said surface portions, said member having an aperture extending therethrough for receiving electrical conductor means insertable in said aperture, the wall of the aperture being formed by the intumescent material;

each of said flanges having an opening extending therethrough communicating with a different end of the aperture in the intumescent member;

a conduit having a first and a second end;

means mounting the first end of said conduit on one of said flanges in substantial alignment with the corresponding flange opening, said flanges being spaced-apart at opposite ends of the aperture;

the aperture being devoid of any body with the exception of the electrical conductor means inserted into said aperture, (1) having good thermal conductivity and extending at least the length of the aperture between said flanges, or (2) which prevents intumescing of the material of said member from closing said aperture.

42. A feed-through floor fitting according to claim 41 and further comprising:

a plurality of discrete elements spaced-apart adjacent said peripheral edges of said flanges outwardly of said aperture in said plates for coupling said flanges together; and a clamping means mounted on the second end of said conduit to hold the fitting in a structural opening.

* * * * *

UNITED STATES PATENT AND TRADEMARK OFFICE
CERTIFICATE OF CORRECTION

PATENT NO. : 4,336,416
DATED : June 22, 1982
INVENTOR(S) : John P. Goodsell

It is certified that error appears in the above-identified patent and that said Letters Patent are hereby corrected as shown below:

References Cited

U.S. Patent Documents 4,272,643  6/1981  Carroll et al ....... 174/48

In the Claims:

Claim 37, lines 28 and 29,  delete "and said intumescent member";

line 51,  change "flanges" to - - flange members - - ;

line 57,  after "said" insert - - intumescent - - ;

line 59,  after "said" insert - - flange - - and change "member" to - - members - - .

Signed and Sealed this

Twenty-first Day of December 1982

[SEAL]

Attest:

GERALD J. MOSSINGHOFF

Attesting Officer   Commissioner of Patents and Trademarks